United States Patent
Lee et al.

(10) Patent No.: US 9,992,046 B2
(45) Date of Patent: Jun. 5, 2018

(54) METHOD AND APPARATUS OF ITERATIVE CHANNEL TRACKING FOR MIMO-OFDM SYSTEM

(71) Applicant: Lilee Systems, Ltd., San Jose, CA (US)

(72) Inventors: Yu-Wei Lee, Hsinchu County (TW); Meng-Chang Doong, Sunnyvale, CA (US)

(73) Assignee: LILEE SYSTEMS, LTD, San Jose, CA (US)

( * ) Notice: Subject to any disclaimer, the term of this patent is extended or adjusted under 35 U.S.C. 154(b) by 0 days. days.

(21) Appl. No.: 15/416,966

(22) Filed: Jan. 26, 2017

(65) Prior Publication Data

US 2017/0222841 A1    Aug. 3, 2017

Related U.S. Application Data

(60) Provisional application No. 62/288,432, filed on Jan. 29, 2016.

(51) Int. Cl.
*H04L 25/06* (2006.01)
*H04L 29/06* (2006.01)
H04B 7/0413 (2017.01)
H04L 27/26 (2006.01)

(52) U.S. Cl.
CPC ............ *H04L 25/061* (2013.01); *H04L 69/22* (2013.01); *H04B 7/0413* (2013.01); *H04L 27/2601* (2013.01)

(58) Field of Classification Search
CPC ............................ H04B 7/0413; H04L 25/061
USPC ......................................................... 375/267
See application file for complete search history.

(56) References Cited

U.S. PATENT DOCUMENTS

| 2001/0004390 A1* | 6/2001 | Pukkila | H04L 25/0212 375/340 |
| 2009/0304125 A1* | 12/2009 | Kim | H04L 1/0048 375/341 |
| 2017/0099089 A1* | 4/2017 | Liu | H04B 7/028 |

* cited by examiner

*Primary Examiner* — Michael Neff
(74) *Attorney, Agent, or Firm* — Blairtech Solution LLC (57) ABSTRACT

Methods and systems for channel estimation using iterative channel tracking algorithm, in a communication system combined multiple input multiple output (MIMO) technology with orthogonal frequency division multiplexing (OFDM), are disclose. The initial channel estimation of a data packet uses the first preamble inserted in front of the OFDM blocks. After demodulating subsequent one or more OFDM blocks, iterative channel tracking method is used for channel estimation until the next preamble is received. The iterative channel tracking is based on the received signals and the demodulated results of subsequent one or more OFDM blocks.

18 Claims, 9 Drawing Sheets

METHOD AND APPARATUS OF ITERATIVE CHANNEL TRACKING FOR MIMO-OFDM SYSTEM

CROSS REFERENCE TO RELATED APPLICATIONS

The present invention claims priority to U.S. Provisional Patent Application No. 62/288,432, filed on Jan. 29, 2016, entitled "Method and Apparatus for Iterative Channel Tracking". The U.S. Provisional Patent Application is hereby incorporated by reference in its entirety.

FIELD OF THE INVENTION

The present invention relates to estimation of channel information for signal demodulation in a digital communication system. In particular, the present invention relates to estimation of channel information by using an iterative channel tracking algorithm in a multiple input multiple output orthogonal frequency division multiplexing (MIMO-OFDM) system.

BACKGROUND

In order to improve performance of digital communication, multiple input multiple output (MIMO) systems are used to replace single input single output systems. In a MIMO system, both the transmitter and the receiver use multiple antennas. Multiple data streams or signals can be transmitted simultaneously by the transmitting antennas. Compared to a single input and single output system, the MIMO system can provide high data throughput by sending independent data streams simultaneously or provide more reliable communications by transmitting the same data stream by multiple antennas.

Orthogonal frequency division multiplexing (OFDM) technique is combined with MIMO to further improve the performance of digital communication. OFDM is a modulation scheme, in which a single data stream is split across several separate narrow-band channels at different frequencies. That means the available frequency band is divided into several subcarriers of smaller bandwidth. By using OFDM in a MIMO system, a frequency-selective MIMO channel is converted into several parallel frequency-flat MIMO channels. The interference among the channels with close frequency can be reduced so that to improve the accuracy of the received signals. Therefore, the combination of multiple input multiple output and orthogonal frequency division multiplexing can be used to improve the data throughput, reliability and sensitivity of wireless communication systems.

Figure 1:
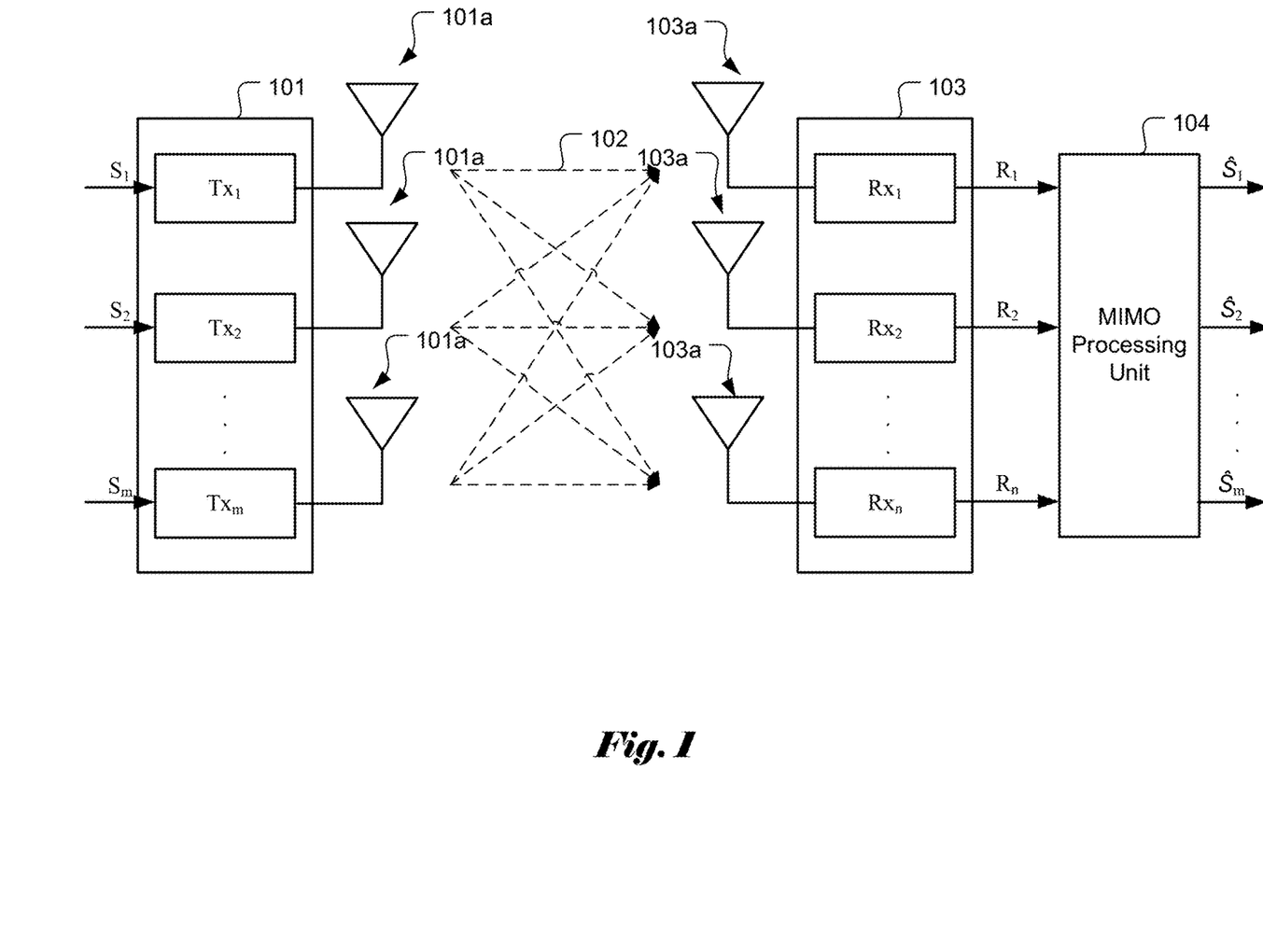
FIG. 1 illustrates an exemplary multiple input multiple output orthogonal frequency division multiplexing (MIMO-OFDM) system.

FIG. 1 illustrates an exemplary diagram of a multiple input multiple output orthogonal frequency division multiplexing (MIMO-OFDM) system. Transmitter 101 consists of m transmitting units represented by $Tx_1$ to $Tx_m$ to send m coded source signals $S_1$ to $S_m$. Each transmitting unit is coupled to an individual antenna 101a. Each transmitting unit includes necessary circuits (e.g. Power Amplifier) to provide a signal to the antenna suited for radiation from the antenna. The channels between transmitter 101 and receiver 103 are illustrated by a set of dash arrows 102. The direction of each dash arrow indicates a data transmission direction in a channel between a transmitting antenna and a receiving antenna. Receiver 103 is equipped with n receiving units, illustrated by $Rx_1$ to $Rx_n$, to detect the transmitted signals. Each receiving unit is coupled to an individual receiving antenna 103a to receive transmitted signals. Each receiving unit includes necessary circuits (e.g. Low Noise Amplifier) to provide received signals for further processing. The received signals are represented by $R_1$ to $R_n$, respectively. In MIMO processing unit 104, the demodulated signals $\hat{S}_1$ to $\hat{S}_m$ are extracted from the received signals based on the channel information between receiver 103 and transmitter 101.

In the MIMO-OFDM system, the channel information is a key factor of signal separation and demodulation. The demodulation performance of the MIMO-OFDM system is very sensitive to the channel information determined before decoding. In traditional methods, the channel information is usually estimated based on a training sequence in the preamble. However, the channel characteristics are constantly changing in a mobile communication system, the update based on the training sequences in the preambles, which are transmitted only periodically in some time slots, will not be dynamic enough to provide fast channel update. The estimation error between the estimated channel information and the actual channel information increases with the channel variation. This can cause serious performance degradation of the MIMO-OFDM system. By simply increase the occurrence of the training preamble may improve the accuracy of channel estimation. Nevertheless, the additional time slot for the preambles will take away valuable bandwidth for transmitted data.

In order to improve the performance of MIMO-OFDM systems, it is desirable to develop a channel estimation algorithm to update the channel information more frequently without sacrificing the valuable channel bandwidth or to provide more accurate control on the estimation error.

BRIEF SUMMARY OF THE INVENTION

In one embodiments of the present invention, a method is provided for estimating channel information for a communication system using multiple input multiple output (MIMO) technology with orthogonal frequency division multiplexing (OFDM). Values of channel information are initially estimated base on a preamble received from multiple receiving antennas. The preamble includes a long training field (LTF) and the values of channel information are estimated using the LTF. Then, the updating for the values of channel information is based on subsequent one or more OFDM blocks before a next preamble is received. The updating for the values of channel information comprises receiving multiple received signals (R), decoding the multiple received signals (R) into multiple symbols (X), determining multiple discrete signals (X'), and deriving updated values of channel information (H'). The received signals (R) are detected by multiple receiving antennas and decoded into multiple symbols X using current values of channel information to remove channel effect. The multiple discrete signals (X') are determined from the multiple symbols (X). The updated values of channel information (H') are derived based on the multiple received signals (R) and the multiple discrete signals (X'). The method may further comprise estimating values of channel information using the next preamble when the next preamble is received. A hard decision modulator may be used to determine the multiple discrete signals (X'). The subsequent one or more OFDM blocks may consist of two OFDM blocks.

The communication system may use a space-time block code (STBC) mode. The multiple received signals (R) consist of 2N received signals for the multiple symbols (X) which consists of N symbols. The value of channel information (H') is an N×N matrix updated based on the 2N received signals and N discrete signals (X'). According to one example of the present invention, N equals to 2. The multiple received signals (R) consist of $R_1$, $R_2$, $R_3$ and $R_4$. The multiple symbols (X) consists of $X_1$ and $X_2$ and the multiple discrete signals (X') consist of $X'_1$ and $X'_2$. The values of channel information (H') correspond to a 2×2 matrix. The four channel parameters $H'_{11}$, $H'_{21}$, $H'_{12}$ and $H'_{22}$ are updated based on the received signals (R) and the multiple discrete signals (X').

The communication system may use a spatial multiplexing mode. The multiple received signals (R) consist of 2N received signals for the multiple symbols (X) which consists of 2N symbols. The value of channel information (H') is an N×N matrix updated based on the 2N received signals and 2N discrete signals (X'). According to one example of the present invention, N equals to 2. The multiple received signals (R) consist of $R_1$, $R_2$, $R_3$ and $R_4$. The multiple symbols (X) consist of $X_1$, $X_2$, $X_3$ and $X_4$. The multiple discrete signals (X') consist of $X'_1$, $X'_2$, $X'_3$ and $X'_4$. The values of channel information (H') correspond to a 2×2 matrix. The four channel parameters $H'_{11}$, $H'_{21}$, $H'_{12}$ and $H'_{22}$ are updated based on the received signals (R) and the multiple discrete signals (X'). The updating of the channel parameters is skipped if $X'_1=X'_2$ and $X'_3=X'_4$, or $X'_1=X'_3$ and $X'_2=X'_4$.

In one embodiments of the present invention, an apparatus is provided for estimating channel information in a communication system using multiple input multiple output (MIMO) technology with orthogonal frequency division multiplexing (OFDM). The apparatus comprises one or more electronic circuits or processors arranged to estimate values of channel information and update the values of channel information. The values of channel information are initially estimated based on a preamble received from multiple receiving antennas. The preamble includes a LTF and the values of channel information are estimated utilizing the LTF. The updating of the values of channel information is based on subsequent multiple OFDM blocks before a next preamble is receive. The values of channel information are updated by further arranging said one or more electronic circuits or processors to receive multiple received signals (R) from the multiple receiving antennas and decode the multiple received signals (R) into multiple symbols (X). The multiple received signals (R) are decoded using current values of channel information to remove channel effects. Said one or more electronic circuits or processors are also arranged to determine multiple discrete signals (X') from the multiple symbols (X) and derive updated values of channel information (H') based on the multiple received signals (R) and the multiple discrete signals (X').

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In order to improve the accuracy of channel estimation in MIMO-OFDM systems, an iterative channel tracking algorithm is developed in the present invention. In embodiments of the present invention, channel information is estimated using both preambles and data of demodulated OFDM block or blocks. The channel information is initially calculated based on a preamble received through the multiple receiving antennas in a MIMO-OFDM system. The preamble includes a channel estimation field that can be used for channel estimation. For example, the channel estimation field may include a long training field (LTF) used for channel estimation. After initial channel information is acquired (i.e., acquisition mode), the system enters a tracking mode to update the channel information using received data blocks prior to the next preamble according to the present invention. Accordingly, after initial channel acquisition based on the preamble, the system demodulates one or more OFDM blocks and uses data of the current one or more OFDM blocks to estimate the channel information for decoding next one or more OFDM blocks until the next preamble is received. The data used for channel estimation include the received signals and the demodulation results of the current one or more OFDM blocks.

Figure 2A:
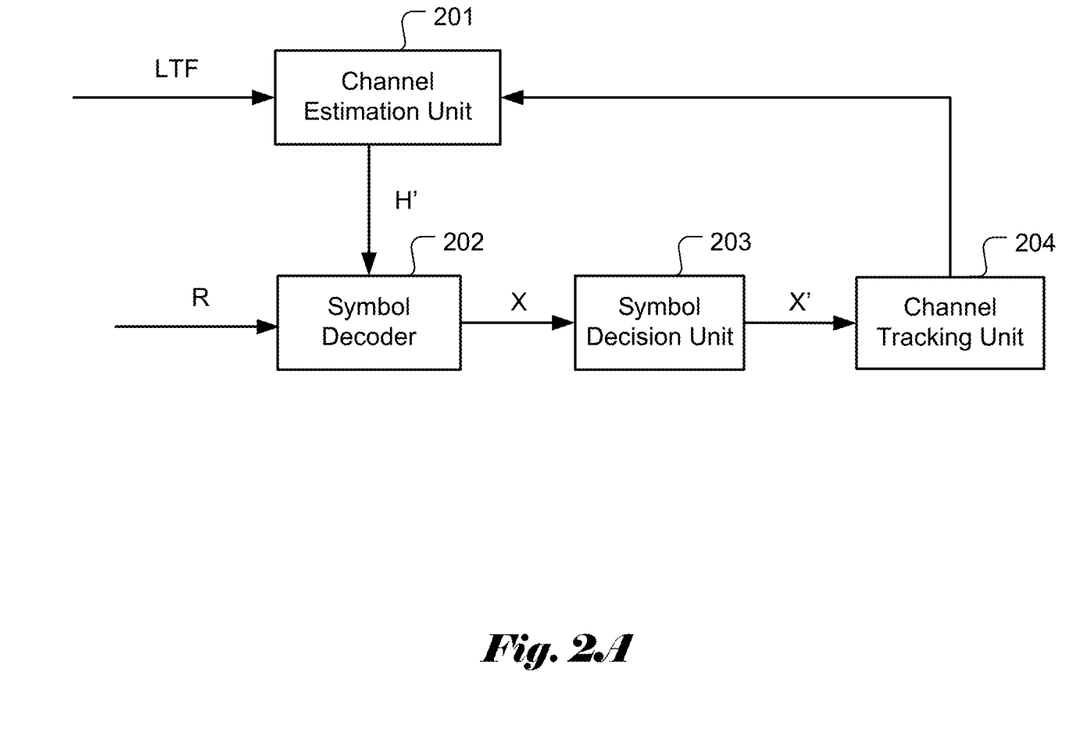
FIG. 2A illustrates an exemplary block diagram for estimating channel information using an iterative channel tracking algorithm according to one embodiment of the present invention.

FIG. 2A shows one exemplary block diagram of estimating channel information using an iterative channel tracking algorithm according to one embodiment of the present invention. The estimated channel information is denoted by H'. For a MIMO-OFDM system with m transmitting antennas and n receiving antennas, H' includes (m×n) channel parameters. According to one embodiment of the present invention, each channel parameter is a complex gain of a channel between a transmitting antenna and a receiving antenna.

The LTF of each preamble is provided to channel estimation unit 201. For the initial estimation of channel information in the data packet, channel estimation unit 201 calculated H' using the LTF of the first preamble. After the initial channel acquisition, channel estimation unit 201 selects the estimated channel information provided by the channel tracking unit 204 during the subsequent OFDM block(s).

Symbol decoder 202 decodes the received signals $R=[R_1, R_2, \ldots, R_n]$ and removes the channel effect based on the estimated channel information selected by channel estimation unit 201. The channel effect on the received symbols is removed in symbol decoder 202 based on the channel information estimated. For the first data block after a preamble, the estimated channel information corresponds to the initial estimated channel information if the preamble is the first preamble received by the receiver or the estimated channel information corresponds to the estimated channel information updated using a preamble if the preamble is a subsequent preamble received by the receiver. For a non-first data block, the estimated channel information corresponds to the estimated channel information updated iteratively using a previous data block The demodulation mode of symbol decoder 202 can be a space-time block code (STBC) mode, a spatial multiplexing mode or other modes applicable to the MIMO-OFDM system. The output of symbol decoder 202 is denoted by $X=[X_1, X_2, \ldots, X_n]$. For most demodulation schemes, the typical output from the symbol decoder is un-quantized symbols.

Figure 2B:
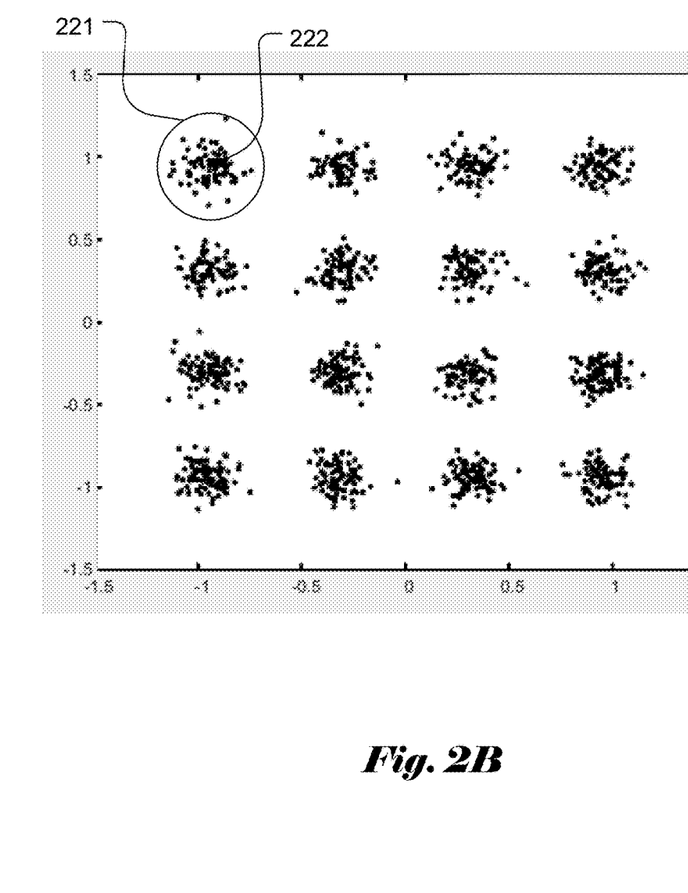
FIG. 2B illustrates exemplary symbols of symbol decoder output and symbol decision output shown in FIG. 2A.

In symbol decision unit 203, the output of the symbol decoder is processed to generate data symbol. The data symbol is represented by discrete signals $X'=[X'_1, X'_2, \ldots, X'_n]$. In scatter plot 221 of FIG. 2B, the corrected data is illustrated by dot 222 and un-quantized symbols of data are shown by scattered dots. According to one embodiment of the present invention, hard decision is used for symbol decision. Soft decision or other methods can also be used to decide the discrete signals. In one example of present invention, two received signals $R_1$ and $R_2$ are detected by the receiver. The symbol decoder generates two symbols $X_1$ and $X_2$ based on the received signals $R_1$ and $R_2$. By using a hard decision demodulator, the symbol decision unit outputs two discrete signals $X'_1$ and $X'_2$, respectively.

Chanel tracking unit 204 uses the discrete signals (i.e., X') and the received signals (i.e., R) to estimate the channel information (i.e., H') for decoding the following one or more OFDM blocks before the next preamble is received. The data of the current OFDM block(s) may be more relative to the next OFDM block(s) compared with the current received preamble. Therefore, the channel information estimated from the current OFDM block(s) may be closer to the actual channel information of the following OFDM block(s). By using the iterative channel tracking algorithm, the estimation error between the actual channel information and the estimated channel information can be reduced and the accuracy of channel estimation can be improved.

Figure 3:
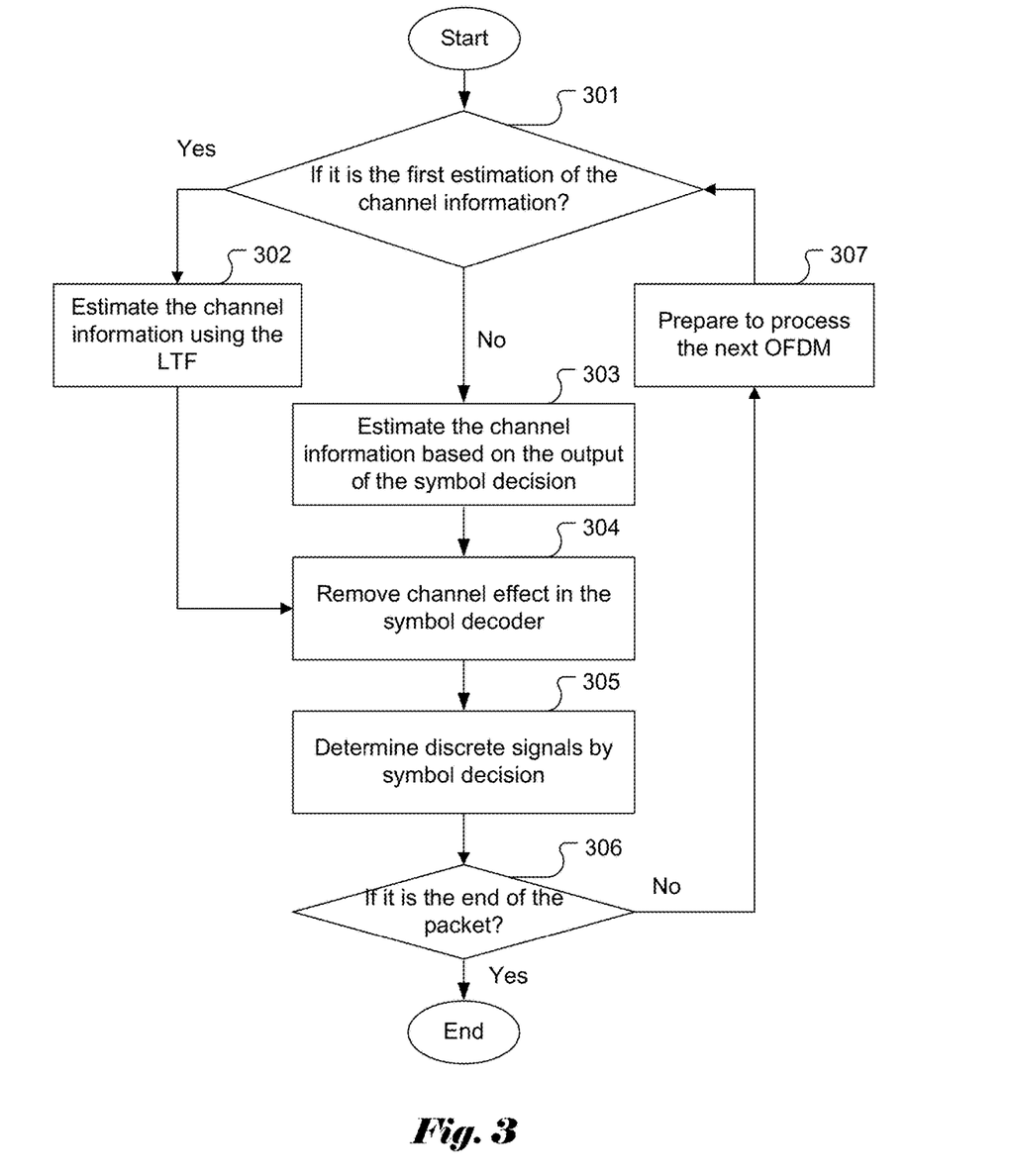
FIG. 3 illustrates an exemplary flow chart for estimating channel information by using an iterative channel tracking algorithm according to one embodiment of the present invention.

The OFDM block or blocks decoded with the same channel information is considered as a decoding unit. FIG. 3 shows an exemplary block diagram of estimating the channel information in a MIMO-OFDM system using an iterative tracking algorithm according to one embodiment of the present invention. Step 301 is used determine if it is the first estimation after receiving a preamble with LTF. If it is the first estimation of channel information (i.e., the "Yes" path from step 301), step 302 is performed. Otherwise (i.e., the "No" path from step 301), step 303 is performed. In step 302, the LTF of the current received preamble is used to estimate the channel information. In step 303, the channel information is estimated by using the symbol decision output of the previous data block (i.e., X') and the received signals (i.e., R). As mentioned before, the symbol decision output is a set of discrete signals. In step 304, the estimated channel information is used to remove the channel effect in the symbol decoder. In step 305, the discrete signals for the current data block are determined from the output of the symbol decoder by symbol decision. After step 305, the data of the current decoding unit is ready for the estimation of the channel information. In step 306, it checks whether it is the end of the data packet. In this step, the end of packets may be determined by counting the block number within the packet. If the data block is the last one in the packet (i.e., "Yes" path from step 306), the estimation of the channel information for the current data packet is stopped. Otherwise (i.e., the "No" path from step 306), processing for the next data block is prepared as shown in step 307.

Figure 4A:
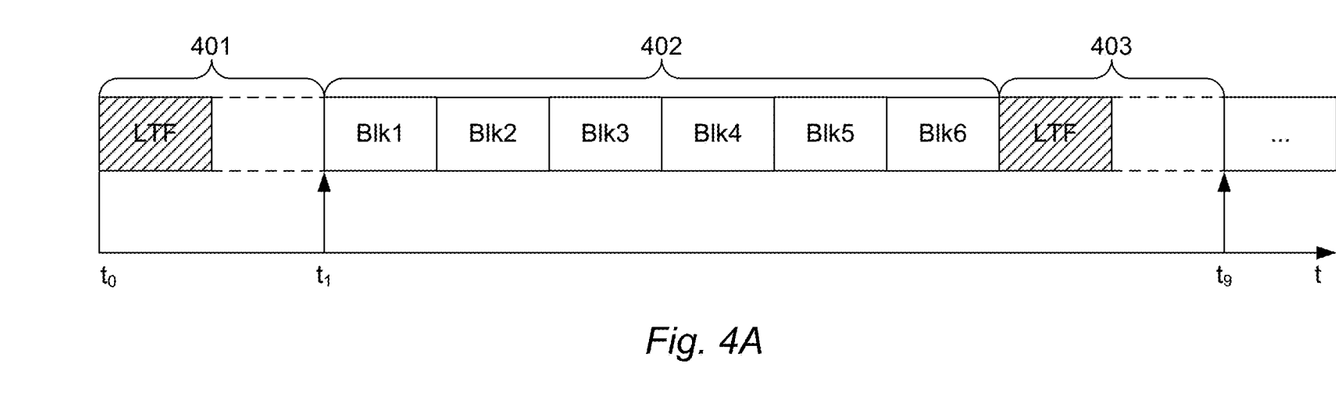
FIG. 4A illustrates an exemplary channel information update plan of a MMO-OFDM system using a traditional channel estimation algorithm.
Figure 4B:
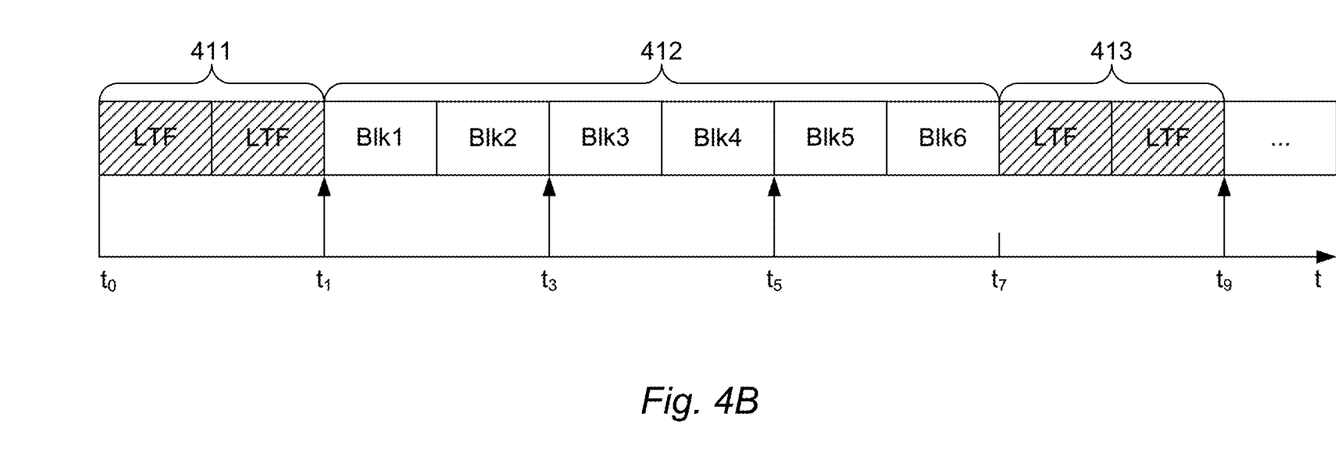
FIG. 4B illustrates an exemplary channel information update plan in a space time block code (STBC) mode according to one example of the present invention.
Figure 4C:
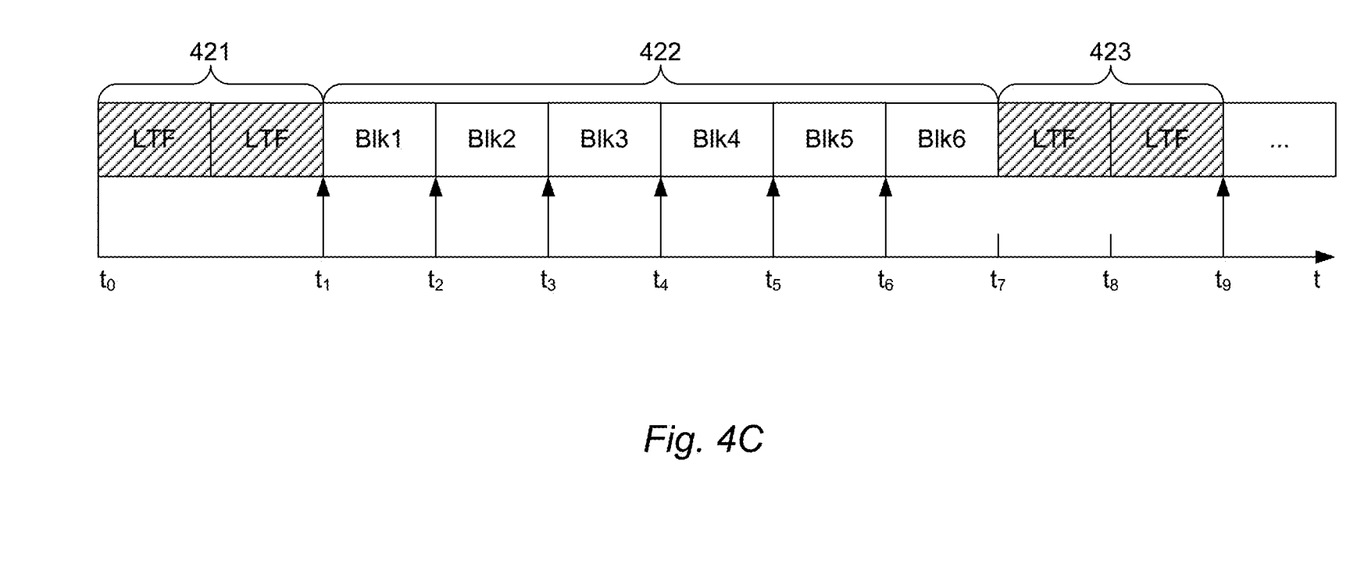
FIG. 4C illustrates an exemplary channel information update plan in a spatial complexing mode according to another example of the present invention.

FIGS. 4A, 4B and 4C illustrate channel information update time for an example in which a preamble includes two LTF blocks inserted in front of six OFDM blocks. The blocks filled with slant lines shows the LTF blocks and the arrows illustrates the update time of channel information. A second preamble is used to reduce the channel estimation error. However, as mentioned earlier, the additional slot for preamble will reduce the channel bandwidth for data. Therefore, the use of additional preamble has to be carefully designed as a tradeoff between system reliability and system bandwidth. For example, the use of the second preamble may be enabled when a higher channel reliability is desired.

FIG. 4A shows an example of channel information update time using traditional estimation method. Preamble 401 contains one LTF blocks inserted in front of six OFDM blocks 402. In time slot ($t1-t_0$), the first preamble is received to estimate the channel information for decoding all the following six OFDM blocks. The estimation of the channel information will not be updated until time $t_9$ when second preamble 403 is provided by another LTF blocks. Either using a STBC mode or a spatial multiplexing mode, the estimation of the channel information is only updated when the preamble is updated.

In the present invention, a data packet may include one or more preambles inserted in a data packet. By increasing the number of preambles in a data packet according to the present invention, the estimation error can also be reduced. Each preamble includes a long training field used to estimate channel information. The period between two preambles depends on the moving speed of the receiver or the transmitter. The faster is the receiver or the transmitter moves, the shorter the period is.

FIG. 4B shows an example of channel information update time using iterative channel tracking according one embodiment of the present invention. In this example, transmitted data is coded in a STBC mode. By using STBC, the channel information is assumed to be constant between two OFDM blocks which are transmitted from one block of coded source data and one block of the conjugates. While channel update is performed for every two data block, the channel update may also be applied one for each group of data blocks with other number of data blocks in each group. For example, the iterative channel tracking can be applied to every data block (more channel update processing required).

The iterative channel tracking can also be applied to every three data blocks (less channel update processing required). After the first estimation based on the first preamble, the channel information is updated based on the data of the previous group of data blocks. For the example shown in FIG. 4B, each group of consists of two OFDM blocks. The first estimation is based on preamble 411 including two LTF blocks. The estimated value of the channel information at $t_1$ is used to decode blocks Blk1 and Blk2. After demodulating one decoding unit, the data of current decoding unit can be used to update the channel information for the next decoding unit. For example, the data of Blk1 and Blk2 is used to estimation the channel formation for decoding blocks Blk3 and Blk4. For decoding the same size data with six OFDM blocks, channel information can be updated for 3 times at $t_1$, $t_3$ and $t_5$. At time $t_7$, the receiver starts to receive another preamble and the channel information may not be updated. In one example of the present invention, the data of Blk5 and Blk6 is also used for updating channel information at time $t_7$. The next update of the channel information is at $t_9$ based on the two LTF blocks of preamble 413.

FIG. 4C shows another example of channel information update time using iterative channel tracking according one embodiment of the present invention. In this example, transmitted data is coded in a spatial multiplexing mode. Each OFDM block can be considered as a decoding unit. The channel information can be update after decoding each OFDM block. The channel information for decoding OFDM block Blk1 is estimated with preamble 421 including two LTF blocks. The channel information for each of the other OFDM blocks is estimated based on the data of the previous OFDM block. For example, the channel information of Blk2 is estimated based on the received data and the symbol decision output of Blk1. For decoding a same size data with 6 OFDM blocks 422, channel information can be updated for 6 times at $t_1$, $t_2$, $t_3$, $t_4$, $t_5$ and $t_6$. Similarly, the update of channel information at time $t_7$ can also be made based on Blk 6, and this update is not necessary. The next update at $t_9$ is based on the next preamble with two LTF blocks of preamble 423.

Figure 5A:
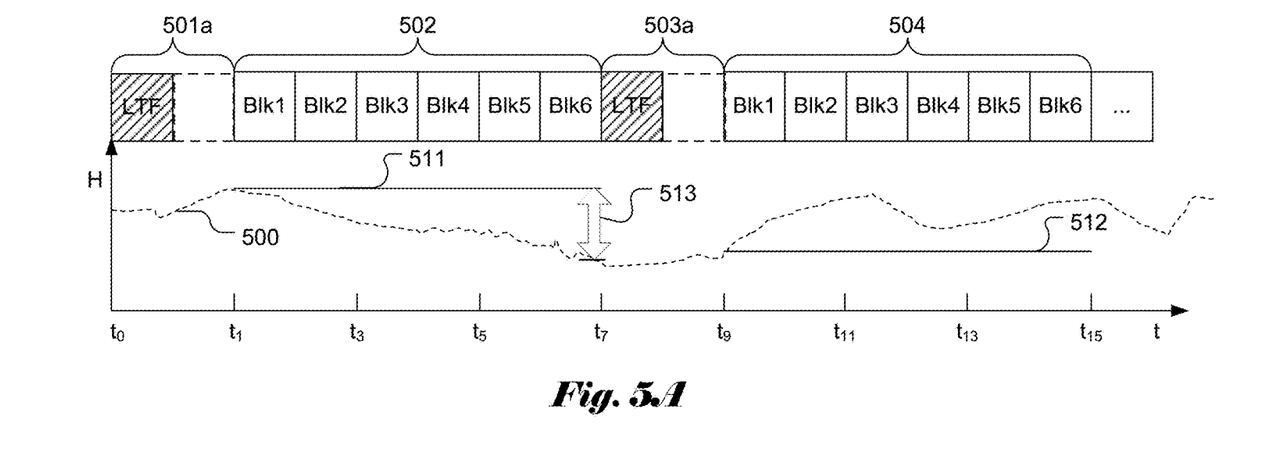
FIG. 5A illustrates an exemplary estimation error of channel information using a channel estimation algorithm based on preambles.
Figure 5B:
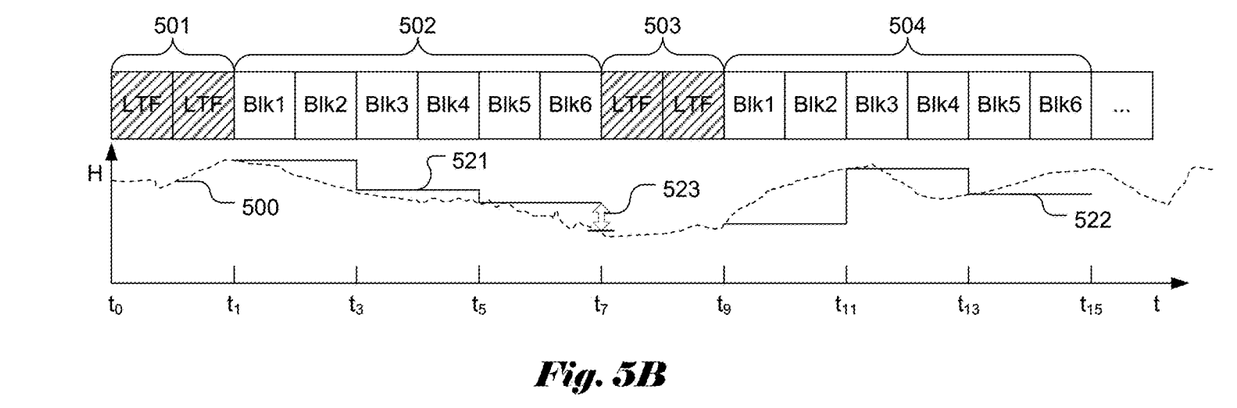
FIG. 5B illustrates an exemplary estimation error of the channel information using an iterative channel tracking algorithm in a STBC mode according to one embodiment of the present invention.

By using iterative channel tracking algorithm, the estimation error between the actual channel information and the estimated channel information can be significantly reduced. FIGS. 5A and 5B show estimation error for processing the same data packet with different methods. The data packet has one preamble (501a and 503a) for a conventional system and two inserted preambles (501 and 503) for an embodiment of the present invention. The number of OFDM blocks between two inserted preambles depends on the rate of wireless channels variation, or the relative movement speed between the transmitter and the receiver. On the other hand, six OFDM blocks (502 and 504) are used in each packet. Dotted line 500 illustrated an example of the actual channel information. FIG. 5A is an example of channel estimation only using preambles. Line 511 represents the estimated channel information based on the LTF of first preamble 501a and line 512 is the estimated channel information based on the LTF of second preamble 503a. The first value of the channel information is updated at $t_1$ based on the first preamble provided in time slot ($t_0$-$t_1$). In the other time slots between $t_1$ and $t_7$, there is no update for channel information until the LTF of preamble 503a is received at time $t_9$. Even if the channel variation is within the predetermined limit, the estimation error can increase significantly with large channel variation. The increasing of the estimation error degrades the demodulation performance. For example, at the end of the packet (i.e., $t_7$), the channel estimation error is indicated by the arrows 513, which corresponds to the difference between the estimated channel values and the actual channel values at the end of the packet.

Using iterative channel tracking can reduce the estimation error caused by inadequate update of the channel information. FIG. 5B shows an example using iterative channel tracking algorithm for channel estimation in a STBC mode. The estimation of channel Information can be updated after decoding each decoding unit with two OFDM blocks. For decoding blocks Blk1 to Blk6, estimation channel information 521 updates three times at time $t_1$, $t_3$ and $t_5$. The channel information for decoding Blk3 and Blk4 is estimated by tracking blocks Blk1 and Blk2. The tracking result of Blk3 and Blk4 is used to update the channel information for decoding Blk5 and Blk6. By using the iterative channel tracking algorithm, the estimation error between actual value and estimated values is reduced based on the data of the previous estimation unit. By comparing FIG. 5A and FIG. 5B, it can be seen the iterative channel tracking algorithm benefits the demodulation performance when the channel information changes slower. For example, at the end of the packet (i.e., $t_7$), the channel estimation error is indicated by the arrows 523. Compared with channel estimation error for the conventional approach, the channel estimation error according to an embodiment of the present invention is much smaller.

Figure 6:
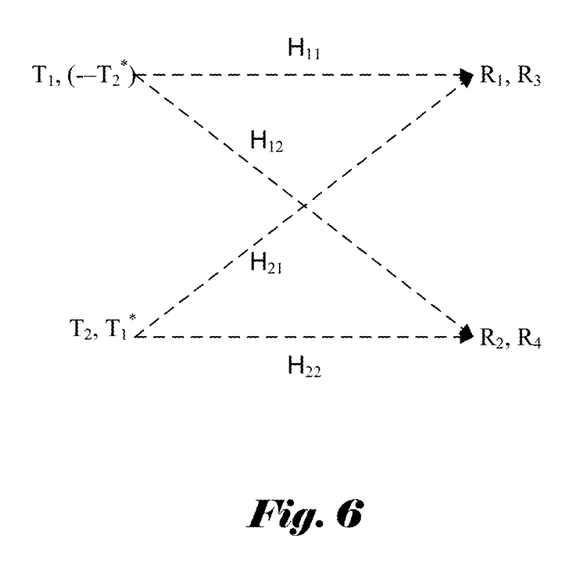
FIG. 6 illustrates an exemplary signal transmission between two transmitting antennas and two receiving antennas in a MIMIO-OFDM system using a STBC mode.

FIG. 6 shows an example of data transmitted in the wireless channel between two transmitting antennas and two transmit receiving antennas in an MIMO-OFDM system. The source data in this example is coded in the STBC mode. In the case that OFDM block $Blk_1$, consists of transmit signals $T_1$ and $T_2$, the conjugates of signals $T_1$ and $T_2$ are transmitted in OFDM block $Blk_{n+1}$. The subscripts n and (n+1) represent the transmission order of the OFDM blocks. As shown in FIG. 6, signals $T_1$ and $(-T_2^*)$ are transmitted by transmitting antenna 1 and signals $T_2$ and $T_1^*$ are transmitted by transmitting antenna 2. Signals $R_1$ and $R_2$ denote the corresponding received data for OFDM block $Blk_n$. Signals $R_3$ and $R_4$ are received from OFDM block $Blk_{n-1}$. Receiving antenna 1 detects signals $R_1$ and $R_3$, and receiving antenna 2 detects signals $R_2$ and $R_4$. The transmitted signals $T_1$ and $T_2$ are demodulated by using received signals $R_1$, $R_2$, $R_3$ and $R_4$.

For the example shown in FIG. 6, there are four channels between the two transmitting antennas and the two received antennas. The actual channel information is denoted by a 2×2 matrix:

$$H = \begin{bmatrix} H_{11} & H_{21} \\ H_{12} & H_{22} \end{bmatrix}. \quad (1)$$

Four channel parameters ($H_{11}$, $H_{12}$, $H_{21}$ and $H_{22}$) are the complex gains of the four channels according to one embodiment of the present invention.

The relationships between the received symbols and the transmitted symbols in the MIMO system are given by with the following equations:

$$R_1 = H_{11}T_1 + H_{21}T_2, \quad (2)$$

$$R_2 = H_{12}T_1 + H_{22}T_2, \quad (3)$$

$$R_3 = H_{11}(-T_2^*) + H_{21}T_1^*, \quad (4)$$

$$R_4 = H_{12}(-T_2^*) + H_{22}T_1^*. \quad (5)$$

Since the actual channel matrix is not known for the receiver, the channel matrix is estimated before decoding data. According to iterative channel tracking algorithm of the present invention, the channel information can be estimated by using the output of the symbol decision together with the received data of a decoding unit. Block $Blk_n$ and $Blk_{n-1}$ are considered as the current decoding unit. If the next blocks $Blk_{n+2}$ and $Blk_{n+3}$ are in the same data packet, the channel information can be estimated based on the demodulation of blocks $Blk_n$ and $Blk_{n+1}$. The estimated channel matrix $$H' = \begin{bmatrix} H'_{11} & H'_{21} \\ H'_{12} & H'_{22} \end{bmatrix}. \tag{6}$$

is calculated with the following equations:

$$H'_{11} = \frac{R_1 X'^*_1 - R_3 X'_2}{|X'_1|^2 + |X'_2|^2}, \tag{7}$$

$$H'_{12} = \frac{R_2 X'^*_1 - R_4 X'_2}{|X'_1|^2 + |X'_2|^2}, \tag{8}$$

$$H'_{21} = \frac{R_1 X'^*_2 + R_3 X'_1}{|X'_1|^2 + |X'_2|^2}, \tag{9}$$

$$H'_{22} = \frac{R_4 X'_1 + R_2 X'^*_2}{|X'_1|^2 + |X'_2|^2}. \tag{10}$$

Signals $X'_1$ and $X'_2$ are the output of symbol decision based on the received signals $R_1$, $R_2$, $R_3$ and $R_4$.

Figure 7:
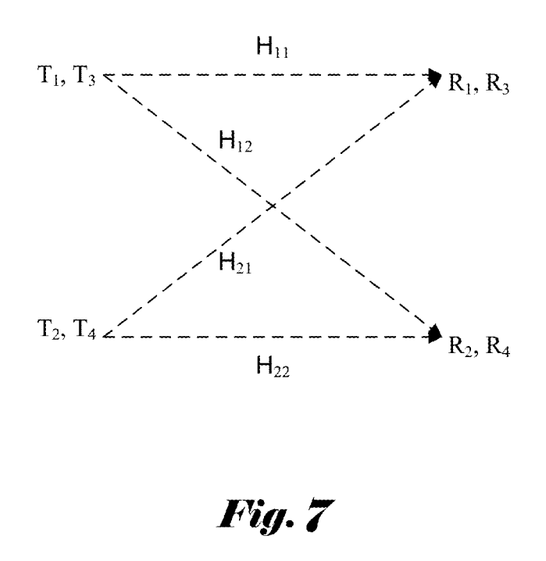
FIG. 7 illustrates an exemplary signal transmission between two transmitting antennas and two receiving antennas in a MIMIO-OFDM system using a spatial complexing mode.

FIG. 7 shows another example of data transmitted in the wireless channel between two transmitting antennas and two transmit receiving antennas in an MIMO-OFDM system. The source data in this example is coded in a spatial multiplexing mode. Coded OFDM block $Blk_n$ consists of transmit signals $T_1$ and $T_2$. The subscripts n represents the transmission order of the coded OFDM block. The (n+1) coded OFDM block consists of transmit signals $T_3$ and $T_4$. As shown in FIG. 7, the first transmitting antenna transmits signals $T_1$ and $T_3$ and the second transmitting antenna transmits signals $T_2$ and $T_4$. Signals $R_1$ and $R_2$ represent the corresponding received data of OFDM block $Blk_n$. Signals $R_3$ and $R_4$ are received from signals $T_3$ and $T_4$ in OFDM block $Blk_{n+1}$.

The actual channel matrix is $$H = \begin{bmatrix} H_{11} & H_{21} \\ H_{12} & H_{22} \end{bmatrix} \tag{11}$$

in which $H_{11}$ to $H_{22}$ are the complex gains of the four channels.

In one embodiment of the present invention, the relationships between the received symbols and the transmitted symbols are given by the following equations:

$$R_1 = H_{11}T_1 + H_{21}T_2, \tag{12}$$

$$R_2 = H_{12}T_1 + H_{22}T_2, \tag{13}$$

$$R_3 = H_{11}T_3 + H_{21}T_4, \tag{14}$$

$$R_4 = H_{21}T_3 + H_{22}T_4. \tag{15}$$

Similarly, the channel information can be estimated based on the received data and the output of the symbol decision by using iterative channel tracking algorithm. In one example of the present invention, blocks $Blk_n$ and $Blk_{n+1}$ are considered as one decoding unit demodulated using the same channel information. If the next two blocks $Blk_{n+2}$ and $Blk_{n+3}$ are in the same data packet, the channel information can be estimated based on the data of blocks $Blk_n$ and $Blk_{n+1}$. The matrix of estimated channel information $$H' = \begin{bmatrix} H'_{11} & H'_{21} \\ H'_{12} & H'_{22} \end{bmatrix}, \tag{16}$$

is calculated with the following equations:

$$H'_{11} = \frac{R_3 X'_2 - R_1 X'_4}{X'_2 X'_3 - X'_1 X'_4}, \tag{17}$$

$$H'_{12} = \frac{R_4 X'_2 - R_2 X'_4}{X'_2 X'_3 - X'_1 X'_4}, \tag{18}$$

$$H'_{21} = \frac{R_1 X'_3 - R_3 X'_1}{X'_2 X'_3 - X'_1 X'_4}, \tag{19}$$

$$H'_{22} = \frac{R_2 X'_3 - R_4 X'_1}{X'_2 X'_3 - X'_1 X'_4}. \tag{20}$$

Signals $X'_1$, $X'_2$, $X'_3$ and $X'_4$ are the output of symbol decision based on demodulating received signals $R_1$ to $R_4$. In the spatial multiplexing mode, the update of channel information can be skipped in the situation when the channel diversity between antennas is eliminated. Therefore, the channel estimation is skipped when $X'_1 = X'_2$ and $X'_3 = X'_4$, or $X'_1 = X'_3$ and $X'_2 = X'_4$.

The above description is presented to enable a person of ordinary skill in the art to practice the present invention as provided in the context of a particular application and its requirement. The invention may be embodied in other specific forms without departing from its spirit or essential characteristics. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Figure 8:
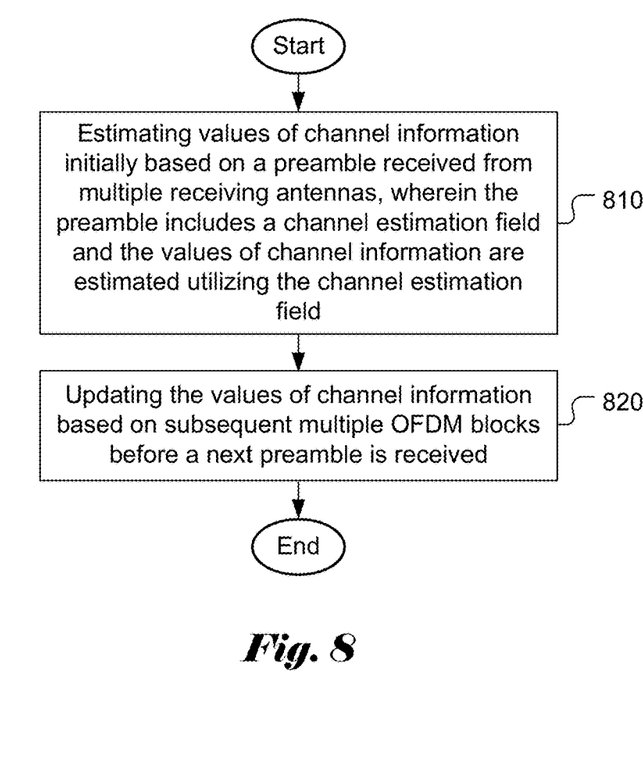
FIG. 8 illustrates an exemplary flowchart for a wireless receiver system incorporating the iterative channel tracking according to an embodiment of the present invention.

An exemplary flowchart for a wireless receiver system incorporating the iterative channel tracking according to an embodiment of the present invention is shown in FIG. 8. According to this method, values of channel information are estimated initially based on a preamble received from multiple receiving antennas, wherein the preamble includes a channel estimation field and the values of channel information are estimated utilizing the channel estimation field in step 810. The values of channel information are updated based on subsequent multiple OFDM blocks before a next preamble is received in step 820, where said updating the values of channel information comprises.

Figure 9:
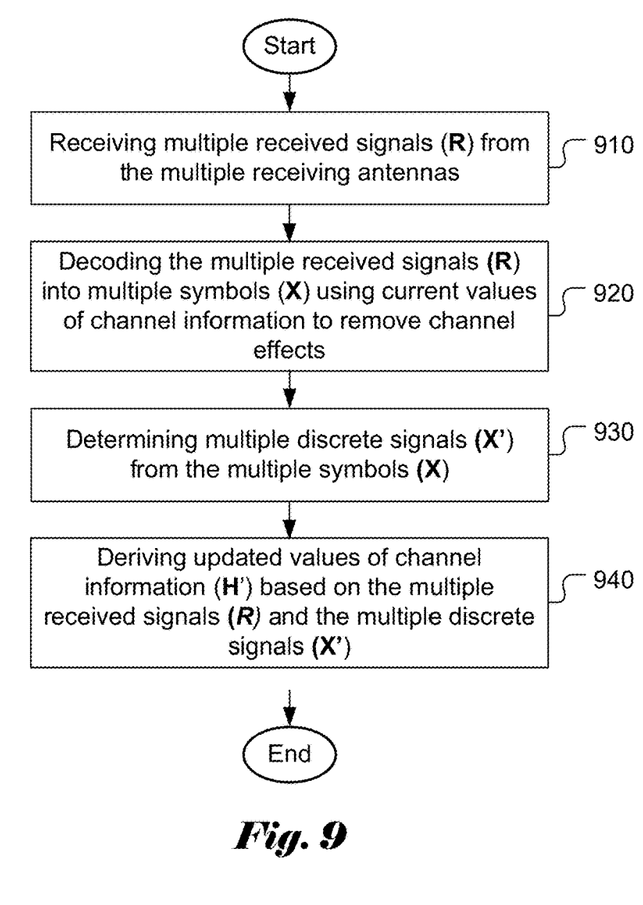
FIG. 9 illustrates an example of updating the values of channel information.

FIG. 9 illustrates an example of updating the values of channel information. Multiple received signals (R) are received from the multiple receiving antennas in step 910. The multiple received signals (R) are decoded into multiple symbols (X) using current values of channel information to remove channel effects in step 920. Multiple discrete signals (X') are determined from the multiple symbols (X) in step 930. Updated values of channel information (H') are derived based on the multiple received signals (R) and the multiple discrete signals (X') in step 940.

The flowcharts shown are intended to illustrate an example of iterative channel tracking according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

Embodiment of the present invention as described above may be implemented in various hardware, software codes, or a combination of both. For example, an embodiment of the present invention can be a circuit integrated into a wireless receiver chip or program codes integrated into wireless receiver software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention claimed is:

1. A method for estimating channel information for a multiple input multiple output (MIMO) communication system with orthogonal frequency division multiplexing (OFDM), the method comprising:
    estimating values of channel information initially based on a preamble received from multiple receiving antennas, wherein the preamble includes a channel estimation field and the values of channel information are estimated utilizing the channel estimation field;
    updating the values of channel information based on subsequent multiple OFDM blocks before a next preamble is received, wherein said updating the values of channel information comprises:
        receiving multiple received signals (R) from the multiple receiving antennas;
        decoding the multiple received signals (R) into multiple symbols (X) according to current values of channel information to remove channel effects;
        determining multiple discrete signals (X') from the multiple symbols (X);
        deriving updated values of channel information (H') based on the multiple received signals (R) and the multiple discrete signals (X'); and
        replacing the values of channel information (H') by the updated values of channel information (H'); and
    wherein the multiple discrete signals (X') are determined by a hard decision demodulator.

2. The method of claim 1, wherein the channel estimation field comprises a long training field (LTF).

3. The method of claim 1, wherein said subsequent one or more OFDM blocks consists of two OFDM blocks.

4. The method of claim 1, further comprising estimating values of channel information based on the next preamble when the next preamble is received.

5. A method for estimating channel information for a multiple input multiple output (MIMO) communication system with orthogonal frequency division multiplexing (OFDM), the method comprising:
    estimating values of channel information initially based on a preamble received from multiple receiving antennas, wherein the preamble includes a channel estimation field and the values of channel information are estimated utilizing the channel estimation field;
    updating the values of channel information based on subsequent multiple OFDM blocks before a next preamble is received, wherein said updating the values of channel information comprises:
        receiving multiple received signals (R) from the multiple receiving antennas;
        decoding the multiple received signals (R) into multiple symbols (X) according to current values of channel information to remove channel effects;
        determining multiple discrete signals (X') from the multiple symbols (X);
        deriving updated values of channel information (H') based on the multiple received signals (R) and the multiple discrete signals (X'); and
        replacing the values of channel information (H') by the updated values of channel information (H'); and
    wherein the multiple input multiple output (MIMO) communication system comprises a space-time block code (STBC) mode, wherein the multiple received signals (R) consist of 2N received signals for the multiple symbols (X) consisting of N symbols, and the values of channel information (H') corresponding to an N×N matrix is updated based on the 2N received signals and N discrete signals (X').

6. The method of claim 5, wherein for N equal to 2, the multiple received signals (R) consist of $R_1$, $R_2$, $R_3$ and $R_4$, the multiple symbols (X) consist of $X_1$ and $X_2$ and the multiple discrete signals (X') consist of $X_1'$ and $X_2'$, the values of channel information (H') correspond to $$H' = \begin{bmatrix} H'_{11} & H'_{21} \\ H'_{12} & H'_{22} \end{bmatrix},$$

and wherein $H_{11}'$, $H_{21}'$, $H_{12}'$ and $H_{22}'$ are updated according to:

$$H_{11}'=(R_1 X_1'^* - R_3 X_2')/(|X_1'|^2+|X_2'|^2),$$

$$H_{12}'=(R_2 X_1'^* - R_4 X_2')/(|X_1'|^2+|X_2'|^2),$$

$$H_{21}'=(R_1 X_2'^* - R_3 X_1')/(|X_1'|^2+|X_2'|^2), \text{ and}$$

$$H_{22}'=(R_4 X_1'^* - R_2 X_2')/(|X_1'|^2+|X_2'|^2).$$

7. A method for estimating channel information for a multiple input multiple output (MIMO) communication system with orthogonal frequency division multiplexing (OFDM), the method comprising:

estimating values of channel information initially based on a preamble received from multiple receiving antennas, wherein the preamble includes a channel estimation field and the values of channel information are estimated utilizing the channel estimation field;

updating the values of channel information based on subsequent multiple OFDM blocks before a next preamble is received, wherein said updating the values of channel information comprises:
  receiving multiple received signals (R) from the multiple receiving antennas;
  decoding the multiple received signals (R) into multiple symbols (X) according to current values of channel information to remove channel effects;
  determining multiple discrete signals (X') from the multiple symbols (X);
  deriving updated values of channel information (H') based on the multiple received signals (R) and the multiple discrete signals (X'); and
  replacing the values of channel information (H') by the updated values of channel information (H'); and
  wherein the multiple input multiple output (MIMO) communication system comprises a spatial multiplexing mode, wherein the multiple received signals (R) consist of 2N received signals for the multiple symbols (X) consisting of 2N symbols, and the values of channel information (H') corresponding to an N×N matrix is updated based on the 2N received signals and 2N discrete signals (X').

8. The method of claim 7, wherein for N equal to 2, the multiple received signals (R) consist of $R_1$, $R_2$, $R_3$ and $R_4$, the multiple symbols (X) consist of $X_1$, $X_2$, $X_3$ and $X_4$ and the multiple discrete signals (X') consist of $X_1'$, $X_2'$, $X_3'$ and $X_4'$, the values of channel information (H') correspond to $$H' = \begin{bmatrix} H'_{11} & H'_{21} \\ H'_{12} & H'_{22} \end{bmatrix},$$

and wherein $H_{11}'$, $H_{21}'$, $H_{12}'$ and $H_{22}'$ are determined according to:

$$H_{11}'=(R_3X_2'-R_1X_4')/(X_2'X_3'-X_1'X_4'),$$

$$H_{12}'=(R_4X_2'-R_2X_4')/(X_2'X_3'-X_1'X_4'),$$

$$H_{21}'=(R_1X_3'-R_3X_1')/(X_2'X_3'-X_1'X_4'), \text{ and}$$

$$H_{22}'=(R_2X_3'-R_4X_1')/(X_2'X_3'-X_1'X_4').$$

9. The method of claim 8, wherein $H_{11}'$, $H_{21}'$, $H_{12}'$ and $H_{22}'$ updating is skipped if $X_1'=X_2'$ and $X_3'=X_4'$, or $X_1'=X_3'$ and $X_2'=X_4'$.

10. An apparatus of estimating channel information for a multiple input multiple output (MIMO) communication system with orthogonal frequency division multiplexing (OFDM), the apparatus comprising one or more electronic circuits or processors arranged to:
  estimate values of channel information initially based on a preamble received from multiple receiving antennas, wherein the preamble includes a channel estimation field and the values of channel information are estimated utilizing the channel estimation field;
  update the values of channel information based on subsequent multiple OFDM blocks before a next preamble is received, wherein the values of channel information are updated by further arranging said one or more electronic circuits or processors to:
    receive multiple received signals (R) from the multiple receiving antennas;
    decode the multiple received signals (R) into multiple symbols (X) according to current values of channel information to remove channel effects;
    determine multiple discrete signals (X') from the multiple symbols (X);
    derive updated values of channel information (H') based on the multiple received signals (R) and the multiple discrete signals (X'); and
    replace the values of channel information by the updated values of channel information (H'); and
  wherein the multiple discrete signals (X') are determined by a hard decision demodulator.

11. The apparatus of claim 10, wherein the channel estimation field comprises a long training field (LTF).

12. The apparatus of claim 10, wherein said subsequent one or more OFDM blocks consists of two OFDM blocks.

13. The apparatus of claim 10, further comprising estimating values of channel information based on the next preamble when the next preamble is received.

14. An apparatus of estimating channel information for a multiple input multiple output (MIMO) communication system with orthogonal frequency division multiplexing (OFDM), the apparatus comprising one or more electronic circuits or processors arranged to:
  estimate values of channel information initially based on a preamble received from multiple receiving antennas, wherein the preamble includes a channel estimation field and the values of channel information are estimated utilizing the channel estimation field;
  update the values of channel information based on subsequent multiple OFDM blocks before a next preamble is received, wherein the values of channel information are updated by further arranging said one or more electronic circuits or processors to:
    receive multiple received signals (R) from the multiple receiving antennas;
    decode the multiple received signals (R) into multiple symbols (X) according to current values of channel information to remove channel effects;
    determine multiple discrete signals (X') from the multiple symbols (X);
    derive updated values of channel information (H') based on the multiple received signals (R) and the multiple discrete signals (X'); and
    replace the values of channel information by the updated values of channel information (H'); and
  wherein the multiple input multiple output (MIMO) communication system comprises a space-time block code (STBC) mode, wherein the multiple received signals (R) consist of 2N received signals for the multiple symbols (X) consisting of N symbols, and the values of channel information (H') corresponding to an N×N matrix is updated based on the 2N received signals and N discrete signals (X').

15. The apparatus of claim 14, wherein for N equal to 2, the multiple received signals (R) consist of $R_1$, $R_2$, $R_3$ and $R_4$, the multiple symbols (X) consist of $X_1$ and $X_2$ and the multiple discrete signals (X') consist of $X_1'$ and $X_2'$, the values of channel information (H') correspond to $$H' = \begin{bmatrix} H'_{11} & H'_{21} \\ H'_{12} & H'_{22} \end{bmatrix},$$

and wherein $H_{11}'$, $H_{21}'$, $H_{12}'$ and $H_{22}'$ are updated according to:

$$H_{11}'=(R_1X_1'^*-R_3X_2')/(|X_1'|^2+|X_2'|^2),$$

$$H_{12}'=(R_2X_1'^*-R_4X_2')/(|X_1'|^2+|X_2'|^2),$$

$$H_{21}'=(R_1X_2'^*-R_3X_1')/(|X_1'|^2+|X_2'|^2), \text{ and}$$

$$H_{22}'=(R_4X_1'^*-R_2X_2')/(|X_1'|^2+|X_2'|^2).$$

16. An apparatus of estimating channel information for a multiple input multiple output (MIMO) communication system with orthogonal frequency division multiplexing (OFDM), the apparatus comprising one or more electronic circuits or processors arranged to:
  estimate values of channel information initially based on a preamble received from multiple receiving antennas, wherein the preamble includes a channel estimation field and the values of channel information are estimated utilizing the channel estimation field;
  update the values of channel information based on subsequent multiple OFDM blocks before a next preamble is received, wherein the values of channel information are updated by further arranging said one or more electronic circuits or processors to:
    receive multiple received signals (R) from the multiple receiving antennas;
    decode the multiple received signals (R) into multiple symbols (X) according to current values of channel information to remove channel effects;
    determine multiple discrete signals (X') from the multiple symbols (X);
    derive updated values of channel information (H') based on the multiple received signals (R) and the multiple discrete signals (X'); and
    replace the values of channel information by the updated values of channel information (H'); and
  wherein the multiple input multiple output (MIMO) communication system comprises a spatial multiplexing mode, wherein the multiple received signals (R) consist of 2N received signals for the multiple symbols (X) consisting of 2N symbols, and the values of channel information (H') corresponding to an N×N matrix is updated based on the 2N received signals and 2N discrete signals (X').

17. The apparatus of claim 16, wherein for N equal to 2, the multiple received signals (R) consist of $R_1$, $R_2$, $R_3$ and $R_4$, the multiple symbols (X) consist of $X_1$, $X_2$, $X_3$ and $X_4$ and the multiple discrete signals (X') consist of $X_1'$, $X_2'$, $X_3'$ and $X_4'$, the values of channel information (H') correspond to $$H' = \begin{bmatrix} H_{11}' & H_{21}' \\ H_{12}' & H_{22}' \end{bmatrix},$$

and wherein $H_{11}'$, $H_{21}'$, $H_{12}'$ and $H_{22}'$ are determined according to:

$$H_{11}'=(R_3X_2'-R_1X_4')/(X_2'X_3'-X_1'X_4'),$$

$$H_{12}'=(R_4X_2'-R_2X_4')/(X_2'X_3'-X_1'X_4'),$$

$$H_{21}'=(R_1X_3'-R_3X_1')/(X_2'X_3'-X_1'X_4'), \text{ and}$$

$$H_{22}'=(R_2X_3'-R_4X_1')/(X_2'X_3'-X_1'X_4').$$

18. The apparatus of claim 17, wherein $H_{11}'$, $H_{21}'$, $H_{12}'$ and $H_{22}'$ updating is skipped if $X_1'=X_2'$ and $X_3'=X_4'$, or $X_1'=X_3'$ and $X_2'=X_4'$.

* * * * *